Dec. 8, 1964 E. R. DUNN 3,159,922

ABRASIVE DISC SETTING GAGE

Filed June 28, 1961

INVENTOR
ELMAN R. DUNN
BY [signature]
ATTORNEY

United States Patent Office
3,159,922
Patented Dec. 8, 1964

3,159,922

ABRASIVE DISC SETTING GAGE

Elman R. Dunn, Beloit, Wis., assignor, by mesne assignments, to Landis Tool Company, Waynesboro, Pa., a corporation of Pennsylvania Filed June 28, 1961, Ser. No. 120,265
4 Claims. (Cl. 33—147)

This invention relates to a disc setting gauge for double spindle disc grinders.

The supporting members for abrasive discs on such machines are arranged for adjustment about horizontal and vertical axes in order to set the abrasive discs in parallel relation or in some predetermined angular relation. The extent of adjustment may be determined roughly by a graduated scale on the supporting members or more precisely, by means of a dial indicator on the supporting members. However, adjusting the supports to the same setting on the scale or indicator in order to reproduce a certain angular relation between the abrasive discs, is not dependable because it does not take into consideration the normal and gradual physical changes in the machine structure due to wear, temperature variations, distortion, etc.

One means for setting the discs more accurately consists of a solid gauge member against which the discs are adjusted until a predetermined amount of force is required to slide the gauge back and forth between the discs. This predetermined amount of force is a matter of sense of feel on the part of the operator and, for this reason, it varies from operator to operator and from time to time with the same operator.

This new method of disc setting has the advantage of performing the measuring at the point where the work is to be ground rather than at some point on the disc supporting structure. The gauging of the space between the discs is done for the purpose of duplication of the setting rather than to provide an initial set-up. The initial set-up is a trial and error process by repeated grinding operations and adjustment of the disc supports until the desired geometry and size of the workpiece is obtained.

It is, therefore, an object of the present invention to provide a disc setting gauge which will give a direct indication of the angular relationship between the operating faces of the discs, independent of the sense of feel of the operator.

Another object is to provide a disc setting gauge having disc engaging members or anvils mounted to accommodate themselves to the disc surface regardless of the angular position of the discs.

Another object is to provide an indicator arranged to be actuated by the means for moving the gauge members into contact with the discs.

Figures 1, 2, 3, 4:
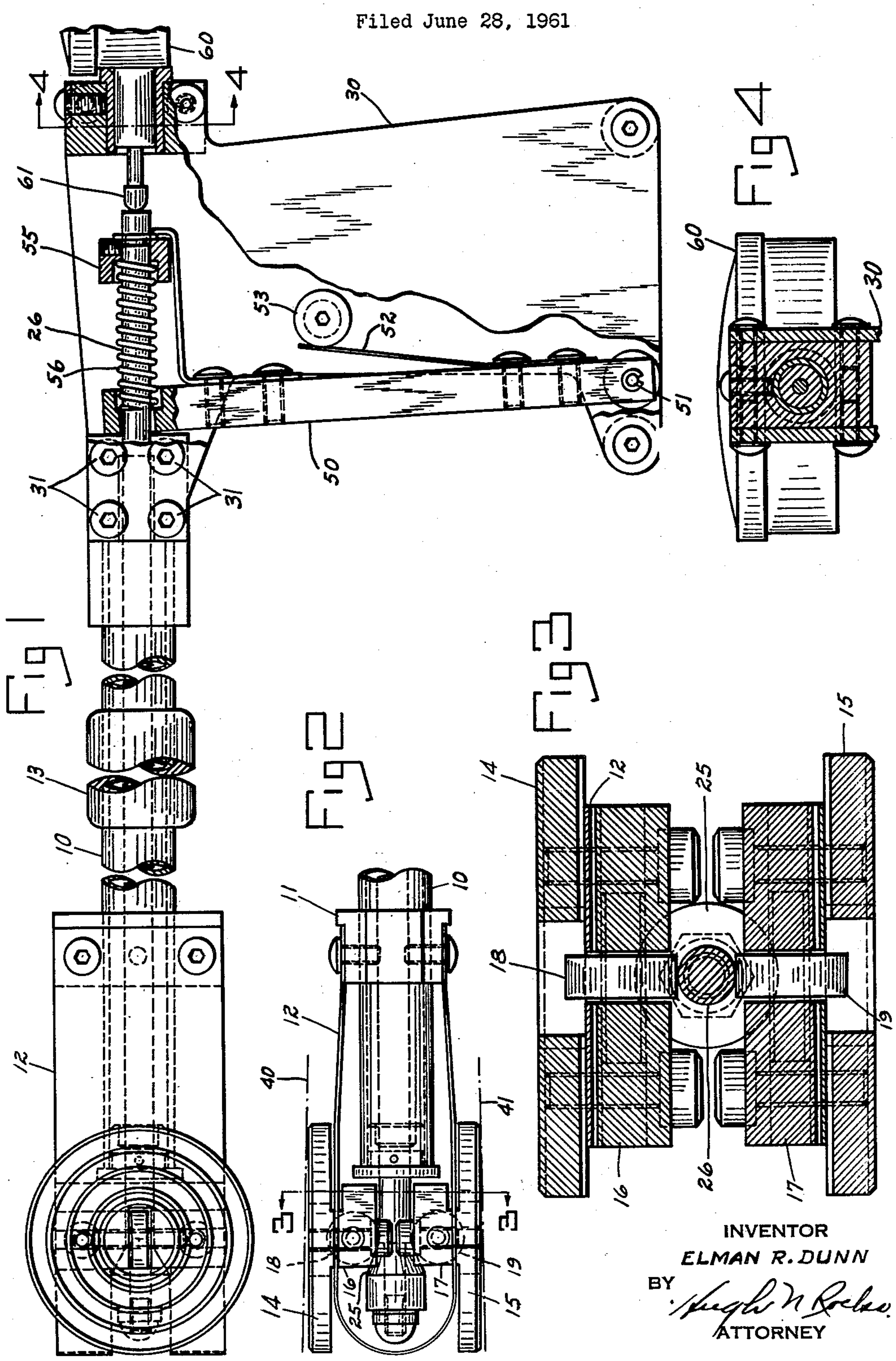
FIG. 1 is a side elevation of a disc setting gauge.
FIG. 2 is a plan view of the front end of the disc setting gauge showing the disc engaging anvils and means for supporting and actuating them.
FIG. 3 is a section along line 3—3 of FIG. 2.
FIG. 4 is a section along line 4—4 of FIG. 1.

The disc setting gauge consists of a housing in the form of a tubular member 10 having bracket 11 at one end. A U-shaped flat spring 12 is attached to opposite sides of bracket 11 and extend along housing 10 to support a pair of disc engaging members in the form of flat plates or anvils 14 and 15 having a substantial area of contact with the opposing faces of the abrasive discs of a double disc grinder. The purpose of this large area of contact is to prevent damage to the discs by excessive penetration such as would occur if there is only a small area of contact between the abrasive discs and the anvils 14 and 15. The operative face of the abrasive disc is further protected in this respect by means which will be described later.

The front end of spring 12 is divided into two spaced parts, to each of which anvils 14 and 15 are attached by clamping members 16 and 17. Spring 12 thus provides a flexible mounting for each of the anvils 14 and 15 so that they can accommodate themselves individually to the planes of the respective abrasive discs whether the discs are parallel or at an angle to one another.

An insulating handle 13 is provided on housing 10 to prevent or minimize elongation of housing 10 because of a change in temperature of housing 10 due to the heat from the operator's hand. The purpose of spring 12 is to provide a flexible support for the disc engaging anvils 14 and 15 so that said anvils may accommodate themselves to the angular position of the opposed discs indicated by lines 40 and 41.

Clamping members 16 and 17 are slotted to receive a pair of peripherally spaced rollers 18 and 19. The slotted portions of clamping members 16 and 17 correspond to the space between the divided portions of spring 12. Rollers 18 and 19 engage a cone-shaped cam member 25 on actuating rod 26 which extends through housing 10 into handle 30 which is attached to housing 10 by means of screws 31.

Trigger member or lever 50 is pivotally mounted in handle 30 at point 51 and is urged in a counter-clockwise direction by spring 52. The upper end of trigger 50 is bored to permit the passage of rod 26. A spring retaining collar 55 is attached to rod 26 and held in spaced relation to trigger 50 by means of spring 56. Movement of trigger 50 in a clockwise direction is limited by stop pin 53 in handle 30, thus determining the maximum pressure for actuating disc engaging anvils 14 and 15. Said maximum pressure is thus uniform for all gaging operations. Indicator 60 is attached to handle 30 with its feeler 61 in contact with the end of rod 26.

*Operation*

The discs, indicated by lines 40 and 41, are adjusted to the desired angular relation by trial and error until a workpiece is ground to the desired width or thickness. It is desirable that a record be made of this setting so that it may be duplicated for grinding the same workpiece at some future time.

For this particular gauge, the nominal spacing, that is, the minimum width between the faces of the disc engaging anvils, is 1½". If the discs are set to grind a workpiece 1" in width, one or both discs must be retracted in order to permit the insertion of the disc engaging anvils 14 and 15. The preferred method is to retract only one disc.

In order to obtain a reading from the disc setting gauge, the retracted space between the discs should be greater than the nominal spacing of 1½". In order to provide this spacing, it is necessary to retract only one disc.

The gauge is then inserted between the discs and the disc engaging members 14 and 15 are expanded by squeezing trigger 50 and moving cam 25 to increase the space between the disc engaging anvils 14 and 15 until they contact firmly with the discs with the force of contact limited by spring 56 so as to avoid damage to the discs.

The operator then slides the entire gauge back and forth while holding trigger 50 in half deflected position, that is, not against pin 53, to insure contact between both discs and the circular land surfaces of the corresponding disc engaging anvils 14 and 15. The operator then squeezes trigger 50 to position against pin 53 and holds it in that position.

The face of indicator 60 is rotated to zero position with trigger 50 against pin 53 and the disc engaging anvils 14 and 15 in total contact with the discs. Trigger 50 is then released and the gauge withdrawn. The gauge is inserted again at a position 180° from the first position along the horizontal centerline through the discs and is again expanded in the manner described above.

The operator notes the difference in the indicator reading from the first position. This reading and other similarly accomplished readings elsewhere between the working faces of the discs, are recorded for the purpose of duplicating the setting for the same workpiece at some future time.

When it is desired to duplicate the above or any other previously recorded set-up, the discs are positioned by the adjusting means described above to the approximate angular relation desired. The left hand disc is adjusted to a position half the thickness of the workpiece from the vertical centerline of the machine. The right hand disc is adjusted to a position greater than the nominal spacing of the disc engaging anvils 14 and 15 from the first disc. The operator inserts the disc setting gauge as previously described and compares the differences in readings with that recorded previously. The operator adjusts the angular position of one head or both heads until the gauge shows the same difference in spacing between the discs at oppositely positioned points in a horizontal plane. The operator then positions the second disc to provide a spacing between the discs equal to that of the desired width or thickness of the workpiece. This is accomplished by using a previously ground workpiece as a spacer between the operative faces of the discs.

I claim:

1. A disc setting gage for a double spindle disc grinder having abrasive discs with annularly opposed operative faces comprising a pair of oppositely disposed area contact disc engaging anvils, a housing, a U-shaped flat spring supporting said anvils on said housing, for frictionless movement toward and from said abrasive discs, gage actuating means for urging said anvils into contact with said abrasive discs, manually operable means for operating said gage actuating means, resilient means between said manually operable means and said gage actuating means to provide a uniform maximum force for holding said anvils in engagement with the faces of said abrasive discs.

2. A disc setting gage for a double spindle disc grinder having abrasive discs with annularly opposed operative faces comprising a pair of oppositely disposed area contact disc engaging anvils, a housing, a U-shaped flat spring flexibly supporting said anvils on said housing for frictionless movement toward and from said abrasive discs, manually operable means on said housing for urging said anvils into engagement with said abrasive discs whether in parallel or non-parallel relation including a spring for transmitting a uniform actuating force from said manually operable means to said anvils.

3. A disc setting gage for a double spindle disc grinder having abrasive discs with annularly opposed operative faces comprising a pair of oppositely disposed area contact disc engaging anvils having relatively large surfaces for engaging said discs, a housing, a U-shaped flat spring for supporting said anvils on said housing for frictionless movement toward and from said abrasive discs, said spring providing a flexible support for said anvils whereby said anvils effect operative engagement with a corresponding area of each of said abrasive discs when said discs are in either parallel or non-parallel relation, means for actuating said anvils to engage said discs comprising a lever, and resilient means between said anvils and said lever whereby said anvils are always held against said discs with the uniform pressure provided by said resilient means.

4. A disc setting gage for a double spindle disc grinder having abrasive discs with annularly opposed operative faces generally in non-parallel relation comprising a pair of oppositely disposed disc engaging anvils having relatively large surfaces for engaging said discs, a housing, a U-shaped flat spring for supporting said anvils on said housing for frictionless movement toward and from said abrasive discs, said spring providing a flexible support for said anvils whereby said anvils to accommodate themselves to parallel or non-parallel discs to effect operative engagement with a corresponding area of each of said abrasive discs when said discs are in either parallel or non-parallel relation, and manual means for actuating said anvils to engage said abrasive discs.

References Cited in the file of this patent

UNITED STATES PATENTS

| | | |
|---|---|---|
| 1,507,272 | Buckingham | Sept. 2, 1924 |
| 2,222,336 | Domellof | Nov. 19, 1940 |
| 2,258,760 | Hecker | Oct. 14, 1941 |

FOREIGN PATENTS

| | | |
|---|---|---|
| 49,164 | Sweden | May 11, 1921 |